United States Patent
Bennice et al.

(10) Patent No.: US 12,214,507 B1
(45) Date of Patent: Feb. 4, 2025

(54) INJECTING NOISE INTO ROBOT SIMULATION

(71) Applicant: GOOGLE LLC, Mountain View, CA (US)

(72) Inventors: Matthew Bennice, San Jose, CA (US); Paul Bechard, Ogdensburg, NY (US); Joséphine Simon, San Francisco, CA (US); Chuyuan Fu, Sunnyvale, CA (US); Wenlong Lu, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/381,786

(22) Filed: Oct. 19, 2023

Related U.S. Application Data

(63) Continuation of application No. 17/336,986, filed on Jun. 2, 2021, now Pat. No. 11,845,190.

(51) Int. Cl.
*B25J 9/16* (2006.01)
*B25J 13/08* (2006.01)

(52) U.S. Cl.
CPC ............. *B25J 9/1671* (2013.01); *B25J 9/163* (2013.01); *B25J 9/1638* (2013.01); *B25J 9/1697* (2013.01); *B25J 13/085* (2013.01); *B25J 13/088* (2013.01)

(58) Field of Classification Search
CPC ........ B25J 9/1671; B25J 9/163; B25J 9/1638; B25J 9/1697; B25J 13/085; B25J 13/088
See application file for complete search history.

(56) References Cited

U.S. PATENT DOCUMENTS

| | | | |
|---|---|---|---|
| 10,800,040 B1 | 10/2020 | Beckman et al. | |
| 10,981,272 B1 | 4/2021 | Nagarajan | |
| 11,400,587 B2 | 8/2022 | Levine | |
| 2012/0048027 A1* | 3/2012 | Hashiguchi | B25J 9/0087 901/27 |
| 2015/0112484 A1 | 4/2015 | Nishida | |
| 2015/0217449 A1* | 8/2015 | Meier | G05D 1/0088 901/1 |
| 2015/0306768 A1* | 10/2015 | Liang | G06F 30/20 703/2 |
| 2017/0065440 A1* | 3/2017 | Ha | B25J 13/085 |

(Continued)

*Primary Examiner* — Adam R Mott
*Assistant Examiner* — Sagar Kc
(74) *Attorney, Agent, or Firm* — Gray Ice Higdon

(57) ABSTRACT

Implementations are provided for increasing realism of robot simulation by injecting noise into various aspects of the robot simulation. In various implementations, a three-dimensional (3D) environment may be simulated and may include a simulated robot controlled by an external robot controller. Joint command(s) issued by the robot controller and/or simulated sensor data passed to the robot controller may be intercepted. Noise may be injected into the joint command(s) to generate noisy commands. Additionally or alternatively, noise may be injected into the simulated sensor data to generate noisy sensor data. Joint(s) of the simulated robot may be operated in the simulated 3D environment based on the one or more noisy commands. Additionally or alternatively, the noisy sensor data may be provided to the robot controller to cause the robot controller to generate joint commands to control the simulated robot in the simulated 3D environment.

16 Claims, 6 Drawing Sheets

(56) References Cited

U.S. PATENT DOCUMENTS

| | | |
|---|---|---|
| 2017/0120449 A1 | 5/2017 | Matsunami et al. |
| 2017/0320210 A1 | 11/2017 | Ding et al. |
| 2017/0351245 A1 | 12/2017 | Zhang |
| 2019/0151882 A1 | 5/2019 | Tritt et al. |
| 2019/0232488 A1* | 8/2019 | Levine ................. G05B 13/027 |
| 2020/0114506 A1* | 4/2020 | Toshev .................. G06N 3/008 |
| 2020/0206913 A1* | 7/2020 | Kaehler ................ G06F 18/24 |
| 2020/0279134 A1 | 9/2020 | Bousmalis |
| 2020/0333752 A1* | 10/2020 | Doerr ..................... B25J 9/1656 |
| 2021/0107157 A1 | 4/2021 | Bai |
| 2021/0205988 A1* | 7/2021 | James ................... B25J 9/1661 |
| 2022/0097226 A1* | 3/2022 | Kwon ................... B25J 18/007 |
| 2022/0111517 A1 | 4/2022 | Bennice |
| 2022/0305646 A1* | 9/2022 | Jain ....................... B25J 9/1671 |
| 2022/0343216 A1* | 10/2022 | Okumura ................ B25J 13/00 |
| 2023/0294279 A1* | 9/2023 | Matsuzaki .............. B25J 9/163 |
| | | 700/245 |

* cited by examiner

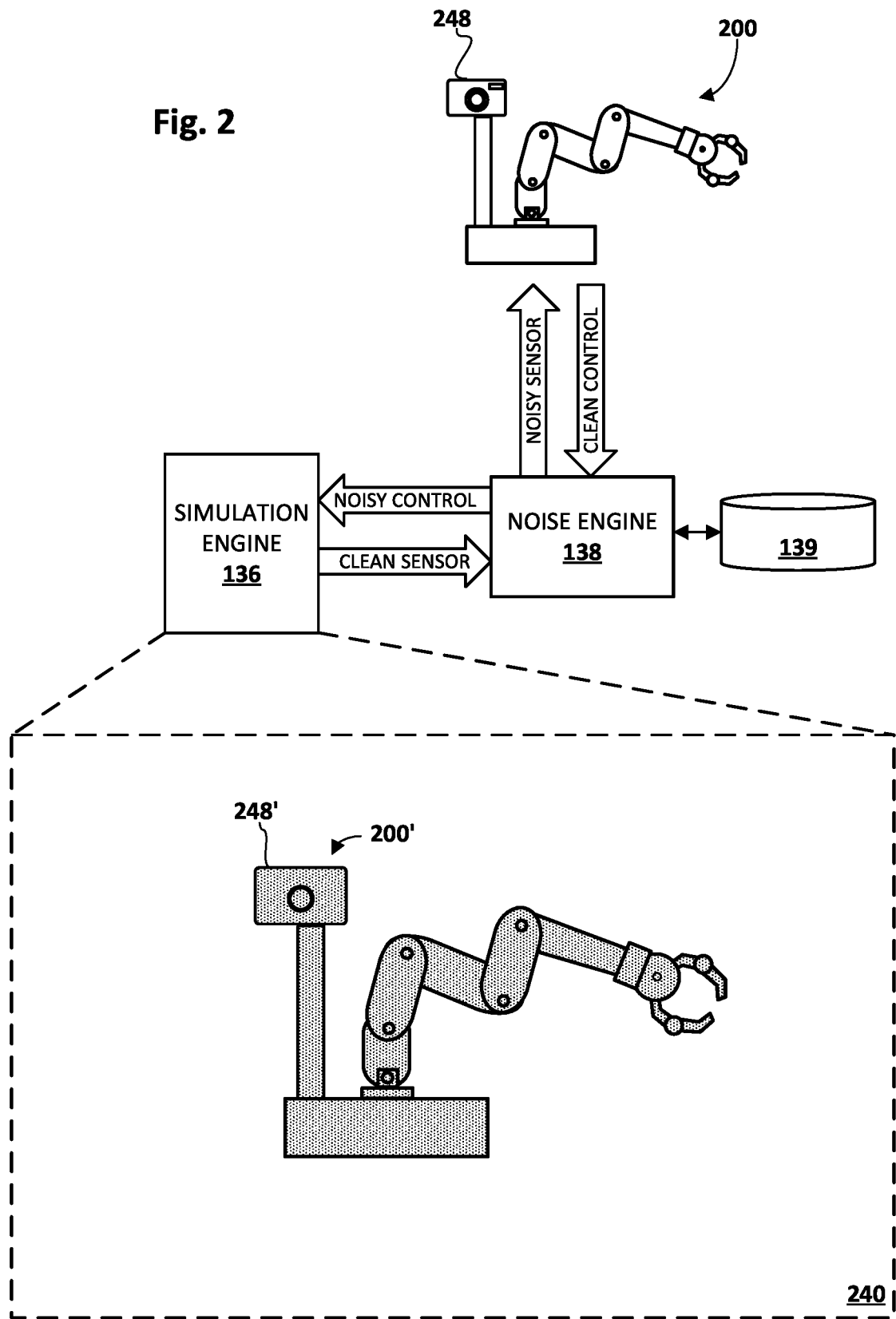

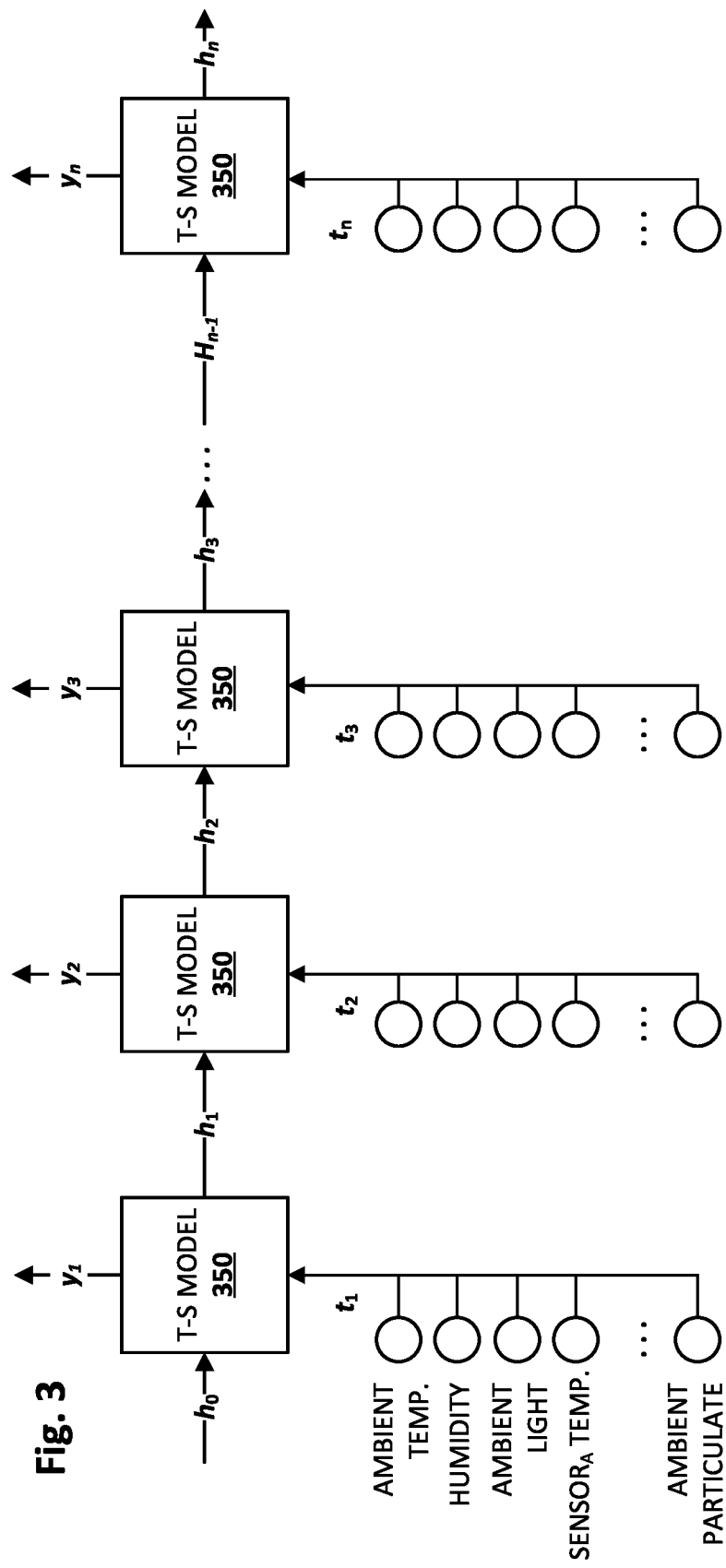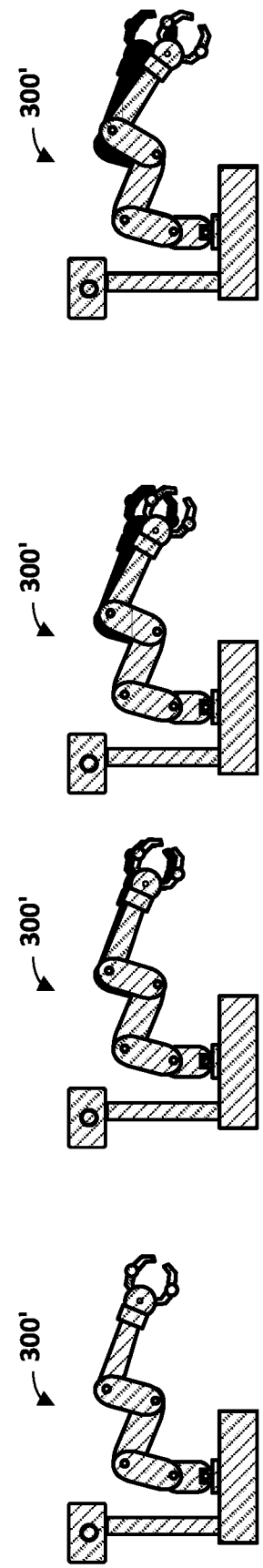
Fig. 3

INJECTING NOISE INTO ROBOT SIMULATION

BACKGROUND

Robots are often equipped with various types of machine learning models, or "policies," that are trained (or "learned") to govern robot behavior during performance of various tasks and/or engagement with dynamic environments. These models are sometimes trained by causing real-world physical robots to repeatedly perform tasks, with outcomes of the repeated tasks being recorded as training episodes and used to tune the models. However, extremely large numbers of training episodes may be needed to sufficiently train a machine learning model to enable a robot to perform tasks in a satisfactory manner.

The time and costs associated with training machine learning models through real-world operation of physical robots may be reduced and/or avoided by simulating robot operation in simulated (or "virtual") environments. For example, a three-dimensional (3D) virtual environment may be simulated in which various robotic tasks may be performed, such as acting upon simulated interactive objects. The robot itself may also be simulated in the virtual environment, and the simulated robot may be operated to perform various tasks in the virtual environment, with one or more of the simulated tasks being recorded as training episodes. The machine learning model(s) can be trained based on outcomes of these training episodes. Robot simulation provides an opportunity to generate and apply a large number of recorded training episodes for relatively little cost. However, robot simulation suffers from a lack of realism, as sensors, joints, and actuators that are simulated in a virtual environment are not affected by real-world stimuli that influence behavior of real-world robots.

SUMMARY

Implementations are described herein for increasing realism of robot simulation by injecting noise into various aspects of the robot simulation. More particularly, but not exclusively, implementations are described herein for intercepting joint commands issued by robot controllers and sensor data provided to robot controllers, injecting noise into those commands/sensor data, and simulating robot operation based on the noisy commands and/or sensor data.

In some (but not all) scenarios in which techniques described herein are practiced, a real-life (e.g., hardware), external robot controller is coupled with a computing system that implements a virtual environment for robot simulation. The robot controller generates and issues sets of joint commands based on observed states of the robot and/or states of the virtual environment. A given state of the virtual environment is ascertained via data generated by one or more virtual sensors based on their observations of the virtual environment. It may be the case that the robot controller is unable to distinguish between operating in the real world and operating in a simulated environment. However, such simulated robot operation may lack the realism of actual, real-life robot performance.

Accordingly, noise may be generated and injected into data that is passed between the robot controller and the virtual environment. For example, joint commands issued by the robot controller may be intercepted and altered to reflect more realistic operation, such as bias on joint(s) caused by gravity, motors operating within a range of tolerances/torques instead of with the same value at all times, etc. Additionally or alternatively, sensor data provided to the robot controller by virtual sensors (e.g., vision sensors, laser sensors, inertial measurement units (IMUs), torque sensors, joint encoders, etc.) that are simulated in the virtual environment may be intercepted and altered to reflect more realistic observations.

Various types of noise may be generated in various ways, depending on the type of data being transmitted. For example, random noise may be generated, e.g., using quasi-random algorithms. More generally, other types of noise that may be generated and injected into joint commands and/or sensor data include, but are not limited to, uniform distribution white noise, multivariate normal distribution white noise, random walk on normal distribution noise, Gaussian noise, affine transforms, blur, chromatic aberration, optical vignetting, motion blur, etc. In some implementations, noise may be generated in a "stateless" fashion in which noise injected at one cycle of robot simulation is generated (e.g., calculated) without consideration of noise injected at previous cycle(s).

In other implementations, "stateful" noise may be generated that simulates realistic operation of joint(s) or sensors over time. For example, a state machine may be implemented (e.g., as a software process between the robot controller and a module that implements the virtual environment) to generate a temporal sequence of progressing noise values, with each progressing noise value being generated based at least in part on a previous progressing noise value. Some such state machines may be Markov chains in which each state's probability depends only on the immediately previous state. Other state machines may depend on more than one previous state. In some implementations, these progressing noise values may be generated using a time-series machine learning model such as a recurrent neural network and/or variations thereof. Such a model may be trained on, for instance, ground truth empirical observations of whatever type of noise the model is meant to model.

In various implementations, these progressing noise values may be injected into corresponding joint commands of a temporal sequence of joint commands. In some such implementations, the temporal sequence of progressing noise values may simulate a bias of gravity over time. This bias may be applied to, for instance, joint commands that trigger oscillations of one or more joints of a simulated robot (e.g., to maintain its arm in an elevated position, the simulated robot may oscillate a motor slightly and/or at a high frequency).

Additionally or alternatively, in some implementations, the temporal sequence of progressing noise values may be injected into corresponding sensor data of a temporal sequence of sensor data samples. In some such implementations, the temporal sequence of progressing noise values may simulate noise generated by a vision sensor such as a digital camera over time, e.g., in response to the camera gradually warming (or cooling, as the case may be). As another example, the temporal sequence of progressing noise values may simulate drift and/or other perturbation of an IMU over time, e.g., caused by thermal-mechanical noise.

In some implementations, a computer implemented method may be provided that includes: simulating a 3D environment, wherein the simulated 3D environment includes a simulated robot controlled by an external robot controller; intercepting one or more joint commands issued by the robot controller to control the simulated robot in the simulated 3D environment; injecting noise into the one or more joint commands to generate one or more noisy commands; and operating one or more joints of the simulated robot in the simulated 3D environment based on the one or more noisy commands.

In various implementations, the one or more joint commands may include a temporal sequence of joint commands. In various implementations, injecting the noise may include: operating a state machine to generate a temporal sequence of progressing noise values, wherein one or more of the progressing noise values are generated based at least in part on one or more previous progressing noise values; and injecting the progressing noise values of the temporal sequence of progressing noise values into corresponding joint commands of the temporal sequence of joint commands. In various implementations, the temporal sequence of progressing noise values may simulate a bias of gravity over time on oscillations of one or more joints of the simulated robot.

In various implementations, the injected noise may be calculated based on one or more operating tolerances of a robot controlled by the robot controller. In various implementations, one or more of the operating tolerances may include a motor operating tolerance. In various implementations, the one or more joint commands may include one or more commands to rotate one or more wheels of the simulated robot, and the injected noise simulates variance in real-world wheel rotation.

In another related aspect, a method implemented using one or more processors may include: simulating a three-dimensional (3D) environment, wherein the simulated 3D environment includes a simulated robot controlled by an external robot controller; intercepting sensor data passed to the robot controller by one or more sensors that are simulated in the simulated 3D environment; injecting noise into the sensor data to generate noisy sensor data; and providing the noisy sensor data to the robot controller to cause the robot controller to generate joint commands to control one or more joints of the simulated robot in the simulated 3D environment.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 schematically depicts an example of how a robot controller may interface with a simulation engine to facilitate generation of a virtual environment that includes a simulated robot controlled by the robot controller, in accordance with various implementations.

FIG. 3 schematically depicts a machine learning-based state machine that can be used to generate noisy joint commands and/or sensor data, in accordance with various implementations of the present disclosure.

DETAILED DESCRIPTION

Figure 1A:
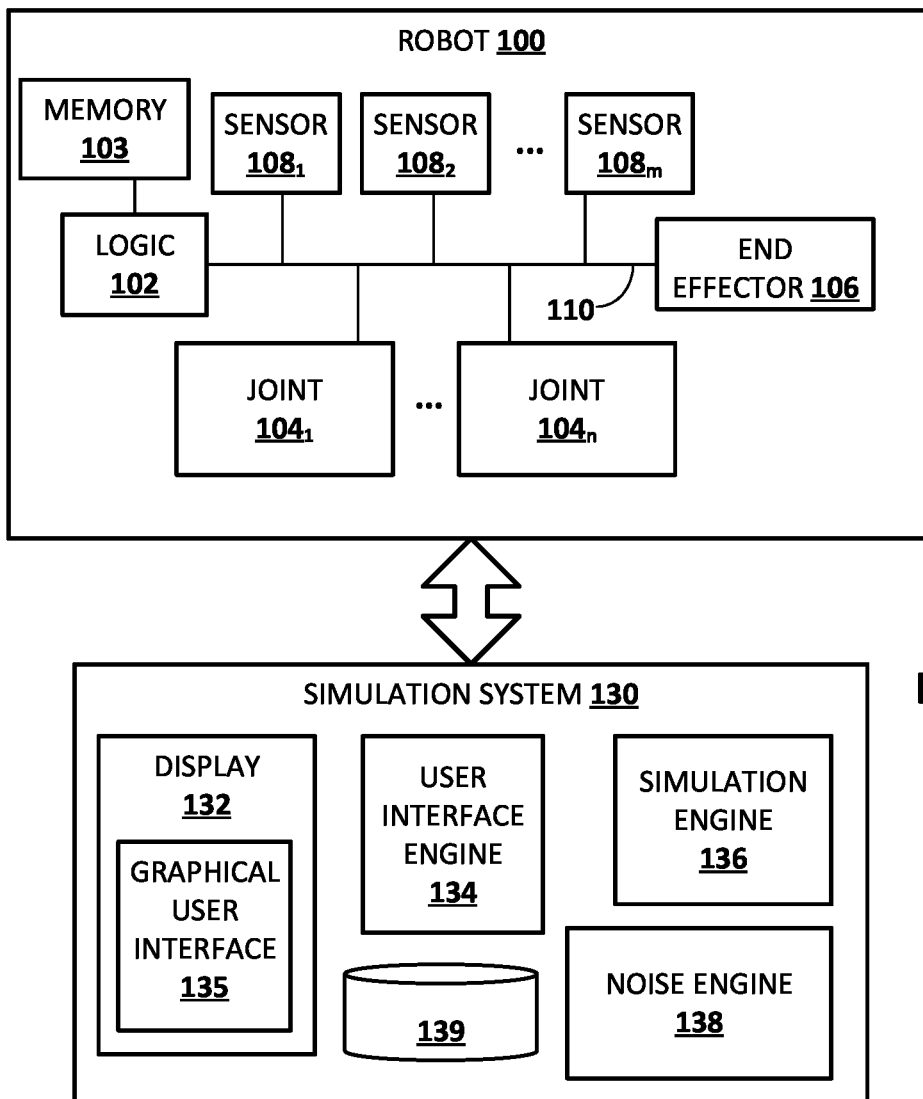
FIG. 1A schematically depicts an example environment in which disclosed techniques may be employed, in accordance with various implementations.

FIG. 1A is a schematic diagram of an example environment in which selected aspects of the present disclosure may be practiced in accordance with various implementations. The various components depicted in FIG. 1A, particularly those components forming a simulation system 130, may be implemented using any combination of hardware and software. In some implementations, simulation system 130 one or more servers forming part of what is often referred to as a "cloud" infrastructure, or simply "the cloud."

Figure 1B:
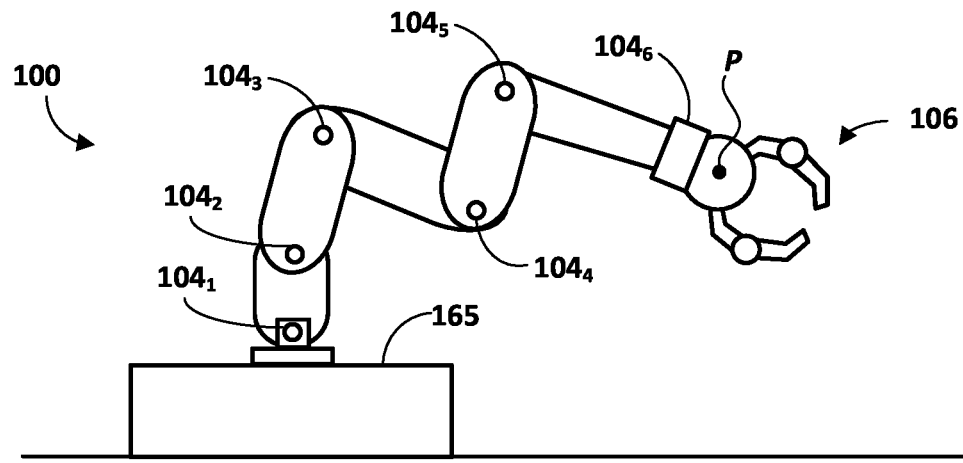
FIG. 1B depicts an example robot, in accordance with various implementations.

A robot 100 may be in communication with simulation system 130. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, an unmanned aerial vehicle ("UAV"), and so forth. One non-limiting example of a robot arm is depicted in FIG. 1B. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more joints $104_1$-$n$, one or more end effectors 106, and/or one or more sensors $108_1$-$m$, e.g., via one or more buses 110. As used herein, "joint" 104 of a robot may broadly refer to actuators, motors (e.g., servo motors), shafts, gear trains, pumps (e.g., air or liquid), pistons, drives, propellers, flaps, rotors, or other components that may create and/or undergo propulsion, rotation, and/or motion. Some joints 104 may be independently controllable, although this is not required. In some instances, the more joints robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances. Some robots, such as some telepresence robots, may not be equipped with end effectors. Instead, some telepresence robots may include displays to render visual representations of the users controlling the telepresence robots, as well as speakers and/or microphones that facilitate the telepresence robot "acting" like the user.

Sensors 108 may take various forms, including but not limited to 3D laser scanners or other 3D vision sensors (e.g., stereographic cameras used to perform stereo visual odometry) configured to provide depth measurements, two-dimensional cameras (e.g., RGB, infrared), light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, and so forth. While sensors $108_1$-$m$ are depicted as being integral with robot 100, this is not meant to be limiting.

Simulation system 130 may include one or more computing systems connected by one or more networks (not depicted). An example of such a computing system is depicted schematically in FIG. 6. In various implementations, simulation system 130 may be operated to simulate a virtual environment in which multiple simulated robots (or "avatars," not depicted in FIG. 1, see FIG. 2) are operated. In various implementations, one or more robot avatars may be controlled by a single robot controller. As noted previously, a robot controller may include, for instance, logic 102 and memory 103 of robot 100.

Various modules or engines may be implemented as part of simulation system 130 as software, hardware, or any combination of the two. For example, in FIG. 1A, simulation system 130 includes a display interface 132 that is controlled, e.g., by a user interface engine 134, to render a graphical user interface ("GUI") 135. A user may interact with GUI 135 to trigger and/or control aspects of simulation system 130, e.g., to control a simulation engine 136 that simulates the aforementioned virtual environment.

Simulation engine 136 may be configured to perform selected aspects of the present disclosure to simulate a virtual environment in which simulated robots can be operated to perform various tasks, e.g., for purposes of recording training episodes that are then usable to learn a robot policy (e.g., train a machine learning model). For example, simulation engine 136 may be configured to simulate a 3D environment that may or may not include one or more interactive objects. The virtual environment may include one or more simulated robots that are controlled by a robot controller (e.g., 102 and 103 of robot 100 in combination) that is external from the virtual environment. Note that the virtual environment need not be rendered visually on a display. In many cases, the virtual environment and the operations of simulated robots within it may be simulated without any visual representation being provided on a display as output.

Simulation engine 136 may be further configured to provide, to the robot controller that controls one or more simulated robots in the virtual environment, sensor data that is generated from a perspective of at least one of the simulated robots that is controlled by the robot controller. As an example, suppose a particular simulated robot's vision sensor is pointed in a direction of a particular virtual object in the virtual environment. Simulation engine 136 may generate and/or provide, to the robot controller that controls that simulated robot, simulated vision sensor data that depicts the particular virtual object as it would appear from the perspective of the particular simulated robot (and more particularly, its vision sensor) in the virtual environment.

Simulation engine 136 may also be configured to receive, from the robot controller that controls one or more simulated robots in the virtual environment, one or more sets of joint commands that cause actuation of one or more joints of one or more of the simulated robots that is controlled by the robot controller. For example, the external robot controller may process the sensor data received from simulation engine 136 to make various determinations, such as recognizing an object and/or its pose (perception), and/or planning a path to the object and/or a grasp to be used to interact with the object. The external robot controller may make these determinations and may generate (execution) joint commands for one or more joints of a simulated robot associated with the robot controller. In the context of the virtual environment simulated by simulation engine 136, these set(s) of joint commands may be used, e.g., by simulation engine 136, to actuate joint(s) of one or more of the simulated robots that are controlled by the external robot controller.

In order to generate realistic training episodes that can be used to train a robot policy such as reinforcement learning machine learning model, a noise engine 138 may be configured to inject various types of noise into various aspects of the robot simulation implemented by simulation engine 136. For example, noise engine 138 may be configured to intercept joint commands provided by robot 100 to simulation system 130 and inject various types of noise into those joint commands, e.g., by altering, skewing, biasing, and/or replacing existing joint command values. In reverse, noise engine 138 may be configured to intercept sensor data generated by simulated sensor(s) that are implemented in the virtual environment by simulation engine 136. In some implementations, noise engine 138 may generate noise to be injected into robot simulation based on data stored in a database 139. To this end, database 139 may include a priori and/or a posteriori data about robot joint(s) and/or data about various types of robot sensors, including how environmental conditions may perturb operation of joints and/or sensors.

With regard to joints, database 139 may store historical and/or empirical data about how various joints (e.g., $104_1$-$n$) and/or end effectors (e.g., 106) may tend to operate in the real world, e.g., in response to environmental conditions (e.g., temperature, humidity, pressure, gravity), wear and tear, etc. Additionally or alternatively, database 139 may store data about operating tolerances of various joints and/or end effectors. These operating tolerances may be determined from a priori knowledge, e.g., provided by a manufacturer based on how the joints are designed, and/or based on empirical observation in the field. In some implementations in which machine learning is employed to generate noise (as is the case with the implementation of FIG. 3), database 139 may store machine learning model weights and/or other parameters.

Similarly, with regard to sensors, database 139 may store a priori knowledge about sensors and/or observed empirical data about how sensors tend to operate in the real world, as well as how environmental stimuli may perturb sensor output. Many vision sensors, such as those implemented using a charge-coupled device (CCD), may tend to heat up during use, and likewise may tend to cool down when not in use. These changes in temperature may perturb sensor output of the vision sensor in various ways, such as by artificially increasing/decreasing color temperature, and/or by introducing vignetting (e.g., natural or otherwise), Gaussian noise, motion blur, and/or chromatic aberration, to name a few. Similarly, output of IMUs, torque sensors, and/or other robot sensors may be perturbed (e.g., skew, drift) over time by mechanical and/or thermal conditions.

FIG. 1B depicts a non-limiting example of a robot 100 in the form of a robot arm. An end effector 106 in the form of a gripper claw is removably attached to a sixth joint 1046 of robot 100. In this example, six joints $104_{1-6}$ are indicated. However, this is not meant to be limiting, and robots may have any number of joints. Robot 100 also includes a base 165, and is depicted in a particular selected configuration or "pose."

FIG. 2 schematically depicts one example of how noise engine 138 may intercept, and inject noise into, data passed between a robot 200 (or more particularly, a controller of robot 200) and simulation engine 136 in order to simulate a virtual environment 240. The real-world robot 200 may operate under various constraints and/or have various capabilities. In this example, robot 200 takes the form of a robot arm, similar to robot 100 in FIG. 1B, but this is not meant to be limiting. Robot 200 also includes a robot controller, not depicted in FIG. 2, which may correspond to, for instance, logic 102 and memory 103 of robot 100 in FIG. 1A. Robot 200 may be operated at least in part based on vision data captured by a vision sensor 248, which may or may not be integral with robot 200.

In the real world (i.e., non-simulated environment), a robot controller may receive, e.g., from one or more sensors (e.g., $108_{1-M}$), sensor data that informs the robot controller about a state of the environment in which the robot operates. The robot controller may process the sensor data (perception) to make various determinations and/or decisions (planning) based on the state, such as path planning, grasp selection, localization, mapping, etc. Many of these determinations and/or decisions may be made by the robot controller using one or more machine learning models, also referred to as "policies." Based on these determinations/decisions, the robot controller may provide (execution) joint commands to various joint(s) (e.g., $104_{1-6}$ in FIG. 1B) to cause those joint(s) to be actuated.

When a robot controller is coupled with virtual environment 240 simulated by simulation engine 136, one or more simulated robots 200' may be operated by the robot controller in a similar fashion. One real robot 200 and one simulated robot 200' are depicted in FIG. 2 for illustrative purposes, but this is not meant to be limiting. Any number of simulated robots 200' may be controlled by any number of robot controllers. In many cases, the robot controller may not be "aware" that it is "plugged into" virtual environment 240 at all, that it is actually controlling virtual joints of simulated robot(s) 200' in virtual environment 240 instead of real joints 1041-n.

Instead of receiving real-world sensor data from real-world sensors (e.g., 108, 248), simulation engine 136 may simulate sensor data within virtual environment 240, e.g., based on a perspective of simulated robot 200' within virtual environment 240. In FIG. 2, for instance, simulated robot 200' includes a simulated vision sensor 248', which is depicted integral with robot avatar 200' for illustrative purposes only. This simulated sensor data may be incorporated by simulation engine 136 into a sensor data channel between a real-world sensor (e.g., 248) of robot 200 and the robot controller that is integral with the robot 200. Thus, from the perspective of the robot controller, the simulated sensor data may not be distinguishable from real-world sensor data.

In various implementations, noise engine 138 intercepts this simulated sensor data (indicated by the "CLEAN SENSOR" in FIG. 2) and injects noise into it. Noise engine 138 then passes this noisy sensor data (indicated by the "NOISY SENSOR" arrow in FIG. 2) to robot 200 (or more particularly, a robot controller of robot 200).

Additionally, and as shown by the arrows in FIG. 2, joint commands generated by the robot controller based on this sensor data simulated via simulated sensor 248' may be provided to simulation engine 136, which operates joints of simulated robot 200' instead of real robot joints of robot 200. For example, the set of joint commands received from the robot controller may be intercepted from a joint command channel between the robot controller and one or more joints of robot 200. In various implementations, these joint commands (indicated by the "CLEAN CONTROL" arrow in FIG. 2) may be intercepted by noise engine 138. Noise engine 138 may inject various types of noise into these joint commands before passing the resulting noisy joint commands (indicated by the "NOISY CONTROL" arrow in FIG. 2) to simulation engine 136. Thus, simulated robot 200' is operated pursuant to both noisy sensor data and noisy joint commands, which may be more realistic—and hence, more suitable for creating effective training episodes—than pure simulated robot operation.

It is not necessary that a fully-functional robot be coupled with simulation engine 136 in order to create/operate simulated robot(s). In some implementations, a robot controller may be executed wholly or partially in software to simulate inputs to (e.g., sensor data) and outputs from (e.g., joint commands) of a robot. Such a simulated robot controller may take various forms, such as a computing device with one or more processors and/or other hardware. A simulated robot controller may be configured to provide inputs and receive outputs in a fashion that resembles, as closely as possible, an actual robot controller integral with a real-world robot (e.g., 200). Thus, for example, the simulated robot controller may output joint commands at the same frequency as they are output by a real robot controller. Similarly, the simulated robot controller may retrieve sensor data at the same frequency as real sensors of a real-world robot. Additionally or alternatively, in some implementations, aspects of a robot that form a robot controller, such as logic 102, memory 103, and/or various busses to/from joints/sensors, may be physically extracted from a robot and, as a standalone robot controller, may be coupled with simulation system 130.

Robots (e.g., 200), standalone robot controllers, and/or simulated robot controllers may be coupled to or "plugged into" virtual environment 240 via simulation engine 136 using various communication technologies. If a particular robot controller or simulated robot controller is co-present with simulation system 130, it may be coupled with simulation engine 136 using one or more personal area networks (e.g., Bluetooth), various types of universal serial bus ("USB") technology, or other types of wired technology (e.g., Ethernet). If a particular robot controller (simulated, standalone, or integral with a robot) is remote from simulation system 130, the robot controller may be coupled with simulation engine 136 over one or more local area and/or wide area networks, such as the Internet.

In various implementations, noise may be simulated in different ways depending on the component (e.g., sensor, joint(s)) noise is being injected into, aspects of the environment being simulated, etc. In some implementations, noise may be injected in a "stateless" or "memoryless" fashion, with the noise injected at each cycle being generated independently from noise injected during previous cycles. However, real-world stimuli tend to influence real-world robot operation over time, e.g., in a cumulative manner. Accordingly, in some implementations, "stateful" noise may be injected into aspects of robot simulation. For example, a state machine may be created, e.g., as software, that simulates real-world environmental stimuli. In some such implementations, such a state machine may be implemented as and/or incorporate one or more machine learning models that are trained, e.g., using real-world empirical data about environmental conditions and their effects on real-world robot operation, to simulate noise that can be injected into robot simulation. One such example is demonstrated schematically in FIG. 3.

FIG. 3 depicts, at bottom, a simulated robot 300' at various stages of simulation to demonstrate an example of how techniques herein may inject noise into robot simulation in a stateful manner. At top of FIG. 3, a time-series ("T-S" in FIG. 3) model 350 such as an RNN, LSTM, GRU, etc. is shown in an "unfolded" state in FIG. 3 to demonstrate how it operates. Time-series model 350 may be trained to operate as a state machine that generates, over a series of iterations, a series of outputs $y_1$-$y_n$ that correspond to noise to be injected into various aspects of simulated robot operation over time. While time-series model 350 is depicted as a single model in FIG. 3, this is not meant to be limiting. A single output y is depicted as being output at each iteration, but this is not meant to be limiting. In various implementations, multiple outputs may be provided at each iteration, and/or node values in hidden layers of a RNN or other similar neural network architecture may be captured and injected as noise into aspect(s) of robot simulation.

At time (=1, time-series model 350 receives a null value as prior input $h_0$ because there is no previous iteration input. However, time-series model 350 also receives various other data that is used to generate outputs $y_1$ and $h_1$ (the latter which is provided as input during the next iteration). In particular, time-series model 350 receives time-series data points for time t=1 that include, for instance, $t_1$ ambient temperature, $t_1$ humidity, $t_1$ ambient light, $t_1$ sensorA temperature (there may be any number of sensor temperatures; one is depicted in FIG. 3 for illustrative purposes), and $t_1$ ambient particulate (e.g., simulated dust or other particulate in the environment being simulated). As shown by the ellipses, any number of other data points may be provided as inputs at each iteration, and any of those data points shown in FIG. 3 may be omitted. Values of these data points may be selected non-deterministically (e.g., quasi-randomly, stochastically) and/or input by users, e.g., in order to control which environmental conditions are simulated.

The various data points depicted in FIG. 3, as well as other data points not depicted, may influence real-world robot operation in a variety of ways. Robots may tend to operate differently in different temperatures, particularly in extreme heat or cold (e.g., parts can become brittle, lubricant properties such as viscosity can change, etc.). Humidity may also influence robot operation and/or operation of various types of sensors, such as light detection and ranging (LIDAR) sensors. Ambient light may or may not directly influence a robot's kinematic operation; however, ambient light may have indirect influence on kinematic operation via its influence on how the robot's sensors perceive an environment, and hence, determine a state of the environment. Individual sensors may also heat up or cool down during and/or after operation. These changes in temperature may affect how those sensors operate. For example, a CCD vision sensor may heat up over time, perturbing the vision data it captures over time. Ambient particulates may accumulate on surfaces and/or within crevices of the robot, changing its mass and/or amounts of friction experienced between joints.

While not shown, other data points that may influence real-world robot operation may include, but are not limited to, wear and tear metrics such as how long each joint has been in service, time between lubrications, power source quality and/or variance, exposure to harsh environments (e.g., salt water, caustic fluids), air pressure, and so forth. Gravity also may have an influence on robot operation. While gravity may remain constant in most environments in which robots operate, robots operating at extreme elevations, in outer space, and/or in extraterrestrial environments such as the Moon or other planets, may experience different levels of gravity.

At each iteration i of time-series model 350, the output $y_i$ may represent noise that is to be injected into a particular aspect of robot operation. For example, and as shown at bottom, at each iteration of simulated robot 300', the robot arm sags somewhat relative to previous iterations, as shown by the position of robot 300' relative to a phantom version of the robot depicted in all black that does not sag over time. This gradual sagging may be attributable to various factors, alone or in combination. These factors may include, for instance, the bias of gravity against high-frequency oscillations required to keep the robot arm slightly elevated, accumulation of particulate on robot 300' (e.g., slightly increasing its mass, and hence, the effect of gravity), diminishing power available to the robot (e.g., a battery losing its power over time), etc. Whatever the case, by inputting these various factors as inputs during each iteration, and by preserving aspects of previous iterations as $h_i$, the output $y_i$ (e.g., vertical or horizontal skewing) generated at each iteration of time-series model 350 may be injected into joint commands so that in simulation, robot 300' tends to sag over time, much like its real-world counterpart would in the real world. Sensor data may be altered similarly. For example, at each iteration, and as a vision sensor heats up, vision data captured by the vision sensor may become more perturbed.

Figure 4:
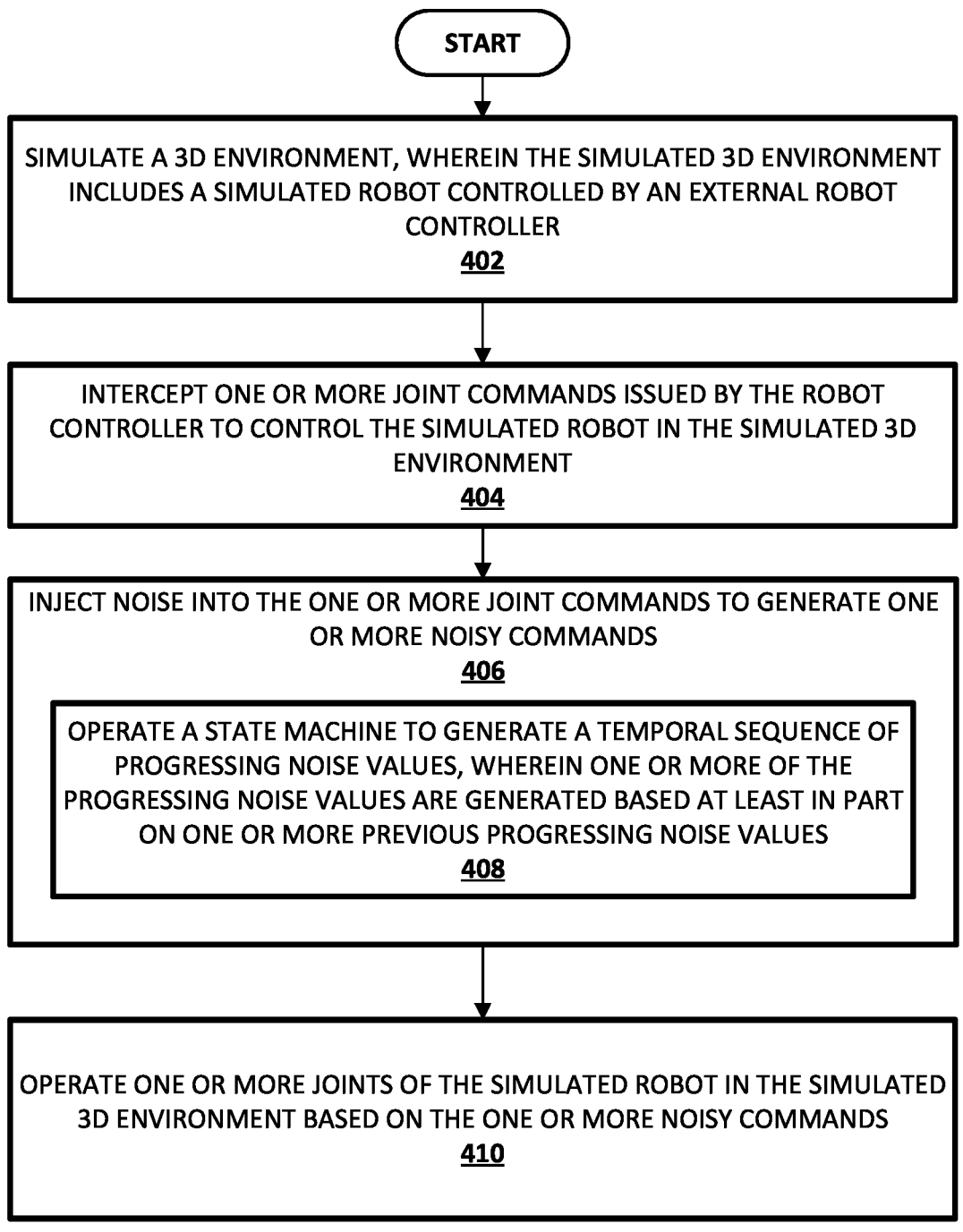
FIG. 4 depicts an example method for practicing selected aspects of the present disclosure.

Referring now to FIG. 4, an example method 400 of injecting noise into joint commands issued to a simulated robot is described. For convenience, the operations of the flowchart are described with reference to a system that performs the operations. This system may include various components of various computer systems. For instance, some operations may be performed at robot 100, while other operations may be performed by one or more components of simulation system 130. Moreover, while operations of method 400 are shown in a particular order, this is not meant to be limiting. One or more operations may be reordered, omitted or added.

At block 402, the system, e.g., by way of simulation engine 136, may simulate a 3D environment that includes a simulated robot (e.g., 200', 300') controlled by an external robot controller (e.g., 102 and 103).

At block 404, the system, e.g., by way of simulation engine 136, may intercept one or more joint commands issued by the robot controller to control the simulated robot in the simulated 3D environment. For example, in some implementations, one or more interceptor processes may be invoked upon the start of robot simulation. In some such implementations, one interceptor process may be implemented for each type of noise that is to be injected. In some implementations, if multiple different types of noise are to be injected into, for instance, joint commands passed from the robot controller to simulation engine 136, a chain of interceptor processes may be invoked, e.g., by noise engine 138, and each interceptor process may inject noise into a particular type of joint command.

At block 406, the system, e.g., by way of noise engine 138 and/or the aforementioned interceptor processors, may inject noise into the one or more joint commands to generate one or more noisy commands. In some implementations, the one or more joint commands may include a temporal sequence of joint commands. In some such implementations, at block 408, the system, e.g., by way of noise engine 138, may operate a state machine to generate a temporal sequence of progressing noise values. One or more of the progressing noise values (e.g., $y_1$-$y_n$ in FIG. 3) may be generated based at least in part on one or more previous progressing noise values (e.g., based on the prior states $h_0$-$h_{n-1}$). These progressing noise values of the temporal sequence of progressing noise values may be injected into corresponding joint commands of a temporal sequence of joint commands.

At block 410, the system, e.g., by way of simulation engine 136, may operate one or more joints of the simulated robot in the simulated 3D environment based on the one or more noisy commands. For example, the simulated robot may interact with one or more objects, interact with other simulated robots, etc.

Figure 5:
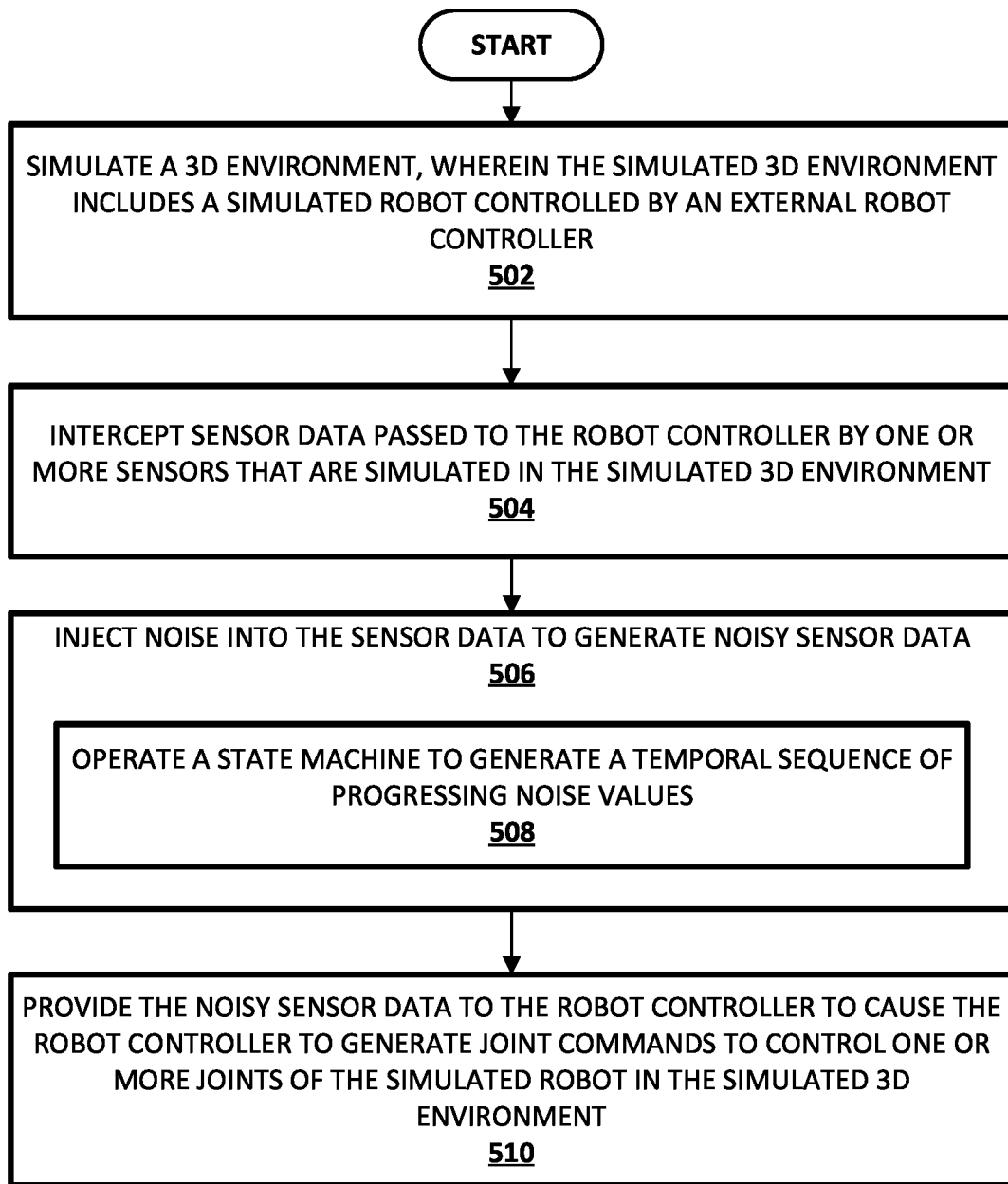
FIG. 5 depicts an example method for practicing selected aspects of the present disclosure.

Referring now to FIG. 5, an example method 500 of injecting noise into sensor data is described. For convenience, the operations of the flowchart are described with reference to a system that performs the operations. This system may include various components of various computer systems. For instance, some operations may be performed at robot 100, while other operations may be performed by one or more components of simulation system 130. Moreover, while operations of method 500 are shown in a particular order, this is not meant to be limiting. One or more operations may be reordered, omitted or added.

At block 502, similar to block 402 of method 400, the system, e.g., by way of simulation engine 136, may simulate a 3D environment that includes a simulated robot controlled by an external robot controller. At block 504, the system may intercept sensor data passed to the robot controller by one or more sensors that are simulated in the simulated 3D environment. Similar to block 404 of method 400, in some implementations, a chain of interceptor processes may be invoked by noise engine 138 to intercept, and inject different types of noise into, sensor data that is passed by simulation engine 136 back to the robot controller.

At block 506, the system may inject noise into the sensor data to generate noisy sensor data. As was the case with method 400, the sensor data may include a temporal sequence of sensor data. In some such implementations, at block 508, the system, e.g., by way of noise engine 138, may operate a state machine to generate a temporal sequence of progressing noise values. One or more of the progressing noise values may be generated based at least in part on one or more previous progressing noise values. These progressing noise values may be injected into corresponding points of a temporal sequence of sensor data.

At block 510, the system, e.g., by way of simulation engine 136, may provide the noisy sensor data to the robot controller to cause the robot controller to generate joint commands to control one or more joints of the simulated robot in the simulated 3D environment.

Figure 6:
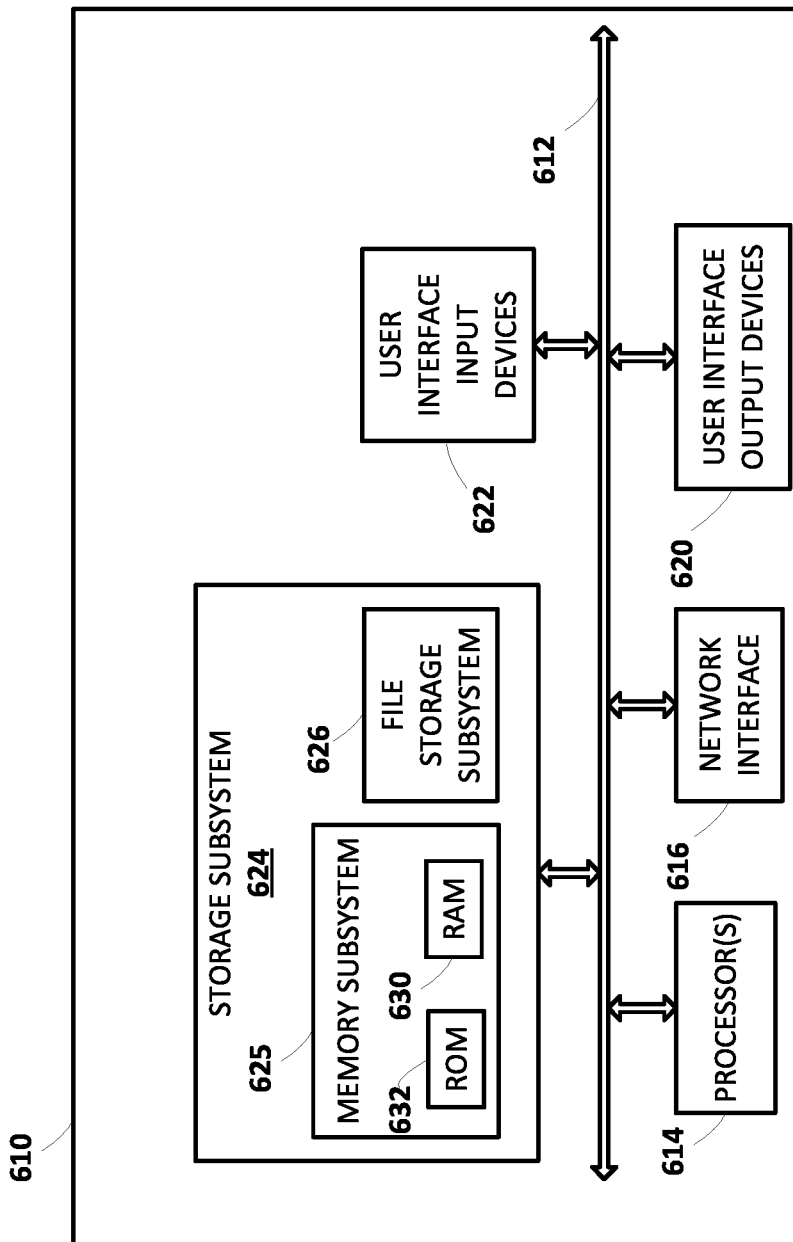
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of methods 400 and 500, and/or to implement one or more aspects of robot 100 or simulation system 130. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    simulating an environment, wherein the simulated environment includes a simulated robot controlled by an external robot controller;
    intercepting a temporal sequence of robot commands issued by the robot controller to control the simulated robot in the simulated environment;
    generating a temporal sequence of progressing noise values using a time series machine learning model, wherein the time series machine learning model is trained based on empirical data about effects of environmental conditions on robot joint operation;
    injecting the temporal sequence of progressing noise values into corresponding robot commands of the temporal sequence of robot commands to generate noisy robot commands, wherein the injecting includes altering, skewing, biasing, or replacing existing robot command values with noisy robot command values; and
    operating the simulated robot in the simulated environment based on the noisy robot commands.

2. The method of claim 1, wherein injecting the temporal sequence of progressing noise values includes:
    operating a state machine to generate the temporal sequence of progressing noise values, wherein one or more progressing noise values of the temporal sequence of progressing noise values are generated based at least in part on one or more previous progressing noise values of the temporal sequence of progressing noise values.

3. The method of claim 1, further comprising generating the temporal sequence of progressing noise values using a time series machine learning model.

4. The method of claim 3, wherein the generating comprises iteratively applying time series data indicative of environmental conditions as inputs across the time series machine learning model.

5. A method implemented using one or more processors, comprising:
    simulating an environment, wherein the simulated environment includes a simulated robot controlled by an external robot controller;
    intercepting a temporal sequence of robot commands issued by the robot controller to control the simulated robot in the simulated environment;
    generating a temporal sequence of progressing noise values using a time series machine learning model, wherein the generating comprises iteratively applying time series data indicative of wear and tear metrics associated with a real-world robot;
    injecting the temporal sequence of progressing noise values into corresponding robot commands of the temporal sequence of robot commands to generate noisy robot commands, wherein the injecting includes altering, skewing, biasing, or replacing existing robot command values with noisy robot command values; and
    operating the simulated robot in the simulated environment based on the noisy robot commands.

6. A method implemented using one or more processors, comprising:
    simulating an environment, wherein the simulated environment includes a simulated robot controlled by an external robot controller;
    intercepting a temporal sequence of robot commands issued by the robot controller to control the simulated robot in the simulated environment;
    injecting a temporal sequence of progressing noise values into corresponding robot commands of the temporal sequence of robot commands to generate noisy robot commands, wherein the injecting includes altering, skewing, biasing, or replacing existing robot command values with noisy robot command values, and wherein the temporal sequence of progressing noise values simulate a bias of gravity over time on oscillations of one or more joints of the simulated robot; and
    operating the simulated robot in the simulated environment based on the noisy robot commands.

7. The method of claim 1, wherein the temporal sequence of progressing noise values are calculated based on one or more operating tolerances of a robot controlled by the robot controller.

8. The method of claim 7, wherein one or more of the operating tolerances include a motor operating tolerance.

9. A system comprising one or more processors and memory storing instructions that, in response to execution by the one or more processors, cause the one or more processors to:
    simulate an environment, wherein the simulated environment includes a simulated robot controlled by an external robot controller;
    intercept a temporal sequence of robot commands issued by the robot controller to control the simulated robot in the simulated environment;
    generate a temporal sequence of progressing noise values using a time series machine learning model, wherein the time series machine learning model is trained based on empirical data about effects of environmental conditions on robot joint operation;
    inject the temporal sequence of progressing noise values into corresponding robot commands of the temporal sequence of robot commands to generate noisy robot commands, wherein the injecting includes altering, skewing, biasing, or replacing existing robot command values with noisy robot command values; and
    operate the simulated robot in the simulated environment based on the noisy robot commands.

10. The system of claim 9, wherein the instructions to inject the temporal sequence of progressing noise values include instructions to:

operate a state machine to generate the temporal sequence of progressing noise values, wherein one or more progressing noise values of the temporal sequence of progressing noise values are generated based at least in part on one or more previous progressing noise values of the temporal sequence of progressing noise values.

11. The system of claim 9, further comprising instructions to generate the temporal sequence of progressing noise values using a time series machine learning model.

12. The system of claim 11, wherein the instructions to generate include instructions to iteratively apply time series data indicative of environmental conditions as inputs across the time series machine learning model.

13. A system comprising one or more processors and memory storing instructions that, in response to execution by the one or more processors, cause the one or more processors to:
   simulate an environment, wherein the simulated environment includes a simulated robot controlled by an external robot controller;
   intercept a temporal sequence of robot commands issued by the robot controller to control the simulated robot in the simulated environment;
   generate a temporal sequence of progressing noise values using a time series machine learning model, wherein the instructions to generate include instructions to iteratively apply time series data indicative of wear and tear metrics associated with a real-world robot;
   inject the temporal sequence of progressing noise values into corresponding robot commands of the temporal sequence of robot commands to generate noisy robot commands, wherein the injecting includes altering, skewing, biasing, or replacing existing robot command values with noisy robot command values; and
   operate the simulated robot in the simulated environment based on the noisy robot commands.

14. A system comprising one or more processors and memory storing instructions that, in response to execution by the one or more processors, cause the one or more processors to:
   simulate an environment, wherein the simulated environment includes a simulated robot controlled by an external robot controller;
   intercept a temporal sequence of robot commands issued by the robot controller to control the simulated robot in the simulated environment;
   inject a temporal sequence of progressing noise values into corresponding robot commands of the temporal sequence of robot commands to generate noisy robot commands, wherein the injecting includes altering, skewing, biasing, or replacing existing robot command values with noisy robot command values, and wherein the temporal sequence of progressing noise values simulate a bias of gravity over time on oscillations of one or more joints of the simulated robot; and
   operate the simulated robot in the simulated environment based on the noisy robot commands.

15. The system of claim 9, wherein the temporal sequence of progressing noise values are calculated based on one or more operating tolerances of a robot controlled by the robot controller.

16. The system of claim 15, wherein one or more of the operating tolerances include a motor operating tolerance.

* * * * *